US011366884B2

(12) United States Patent
Liu et al.

(10) Patent No.: US 11,366,884 B2
(45) Date of Patent: Jun. 21, 2022

(54) AUTHENTICATION CHALLENGES BASED ON FRAUD INITIATION REQUESTS

(71) Applicant: AMERICAN EXPRESS TRAVEL RELATED SERVICES COMPANY, INC., New York, NY (US)

(72) Inventors: David W. Liu, Mesa, AZ (US); Pradeep Vallanur Ramesh, Cave Creek, AZ (US); Rohit Chaturvedi, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 539 days.

(21) Appl. No.: 15/896,969

(22) Filed: Feb. 14, 2018

(65) Prior Publication Data

US 2019/0251234 A1    Aug. 15, 2019

(51) Int. Cl.
| | |
|---|---|
| *G06Q 40/02* | (2012.01) |
| *G06F 21/31* | (2013.01) |
| *G06Q 20/38* | (2012.01) |
| *G06Q 20/40* | (2012.01) |
| *G06F 21/44* | (2013.01) |
| *G06F 21/45* | (2013.01) |
| *G06F 21/64* | (2013.01) |

(52) U.S. Cl.
CPC ............. *G06F 21/31* (2013.01); *G06F 21/44* (2013.01); *G06F 21/45* (2013.01); *G06F 21/64* (2013.01); *G06Q 20/385* (2013.01); *G06Q 20/4016* (2013.01)

(58) Field of Classification Search
CPC .......... G06F 21/31; G06F 21/44; G06F 21/45; G06F 21/64; G06Q 20/385; G06Q 20/4016; G06Q 40/025; G06Q 40/08
USPC ...................................... 705/35–44
See application file for complete search history.

(56) References Cited

U.S. PATENT DOCUMENTS

| | | | | |
|---|---|---|---|---|
| 8,666,841 B1 * | 3/2014 | Claridge | ............ | G06Q 20/4016 705/26.35 |
| 9,210,156 B1 * | 12/2015 | Little | ............... | G06F 16/9535 |
| 10,432,605 B1 * | 10/2019 | Lester | .................. | G06F 21/552 |
| 10,755,281 B1 * | 8/2020 | Yip | .................... | G06Q 20/4016 |

(Continued)

OTHER PUBLICATIONS

Sartain, J. (2012). How to protect online transactions. Network World, 29(3), 14-15. Retrieved from https://dialog.proquest.com/professional/docview/923625459?accountid=131444. Year 2012.*

(Continued)

*Primary Examiner* — Hani M Kazimi
(74) *Attorney, Agent, or Firm* — Thomas | Horstemeyer LLP

(57) ABSTRACT

Systems for issuing authentication challenges based on fraud initiation requests are provided. The system may calculate a fraud risk level based on a fraud initiating request comprising identity-based data. In response to the fraud risk level indicating a risk of fraud, the system may generate an authentication challenge based on an authentication challenge type and an authentication challenge delivery channel. The system may transmit the authentication challenge and receive back an authentication challenge response. The system may verify the authentication challenge response and generate an authentication outcome based on the verification.

20 Claims, 5 Drawing Sheets

(56) References Cited

U.S. PATENT DOCUMENTS

| | | | |
|---|---|---|---|
| 10,972,458 B1* | 4/2021 | Gaeta | H04L 63/08 |
| 2005/0097320 A1 | 5/2005 | Golan et al. | |
| 2008/0066165 A1 | 3/2008 | Rosenoer | |
| 2009/0319287 A1* | 12/2009 | Hammad | G06Q 40/02 |
| | | | 705/1.1 |
| 2010/0094768 A1* | 4/2010 | Miltonberger | G06Q 10/067 |
| | | | 705/325 |
| 2010/0114776 A1* | 5/2010 | Weller | H04L 9/3213 |
| | | | 705/44 |
| 2012/0109821 A1* | 5/2012 | Barbour | G06Q 40/02 |
| | | | 705/44 |
| 2012/0158574 A1 | 6/2012 | Brunzell et al. | |
| 2014/0237242 A1 | 8/2014 | Hoornaert et al. | |
| 2015/0026027 A1* | 1/2015 | Priess | G06Q 40/00 |
| | | | 705/35 |
| 2015/0106265 A1* | 4/2015 | Stubblefield | G06Q 50/265 |
| | | | 705/44 |
| 2015/0356562 A1* | 12/2015 | Siddens | G06Q 20/4016 |
| | | | 705/44 |
| 2016/0078436 A1* | 3/2016 | Tomasofsky | G06Q 20/4014 |
| | | | 705/44 |
| 2016/0078444 A1* | 3/2016 | Tomasofsky | G06Q 20/36 |
| | | | 705/44 |
| 2016/0260100 A1* | 9/2016 | Wiesman | G06Q 20/4016 |
| 2016/0321652 A1* | 11/2016 | Dimmick | G06Q 20/401 |
| 2017/0039564 A1 | 2/2017 | Lanc | |
| 2017/0063932 A1* | 3/2017 | Hubbard | H04L 63/0861 |
| 2017/0180362 A1 | 6/2017 | Du | |
| 2017/0300911 A1* | 10/2017 | Alnajem | G06Q 10/0635 |
| 2018/0033009 A1* | 2/2018 | Goldman | G06Q 20/4016 |
| 2018/0082299 A1* | 3/2018 | Al Anbari | H04L 63/08 |
| 2018/0101851 A1* | 4/2018 | Lowen | G06Q 20/4016 |
| 2019/0205885 A1* | 7/2019 | Lim | G06N 5/003 |
| 2020/0265416 A1* | 8/2020 | Tomasofsky | G06Q 20/4014 |
| 2020/0403992 A1* | 12/2020 | Huffman | H04L 63/102 |

OTHER PUBLICATIONS

Schmidt, R. (2007). Two-factor authentication for online banking. Mortgage Banking, 67(11), 117-119,125. Retrieved from https://dialog.proquest.com/professional/docview/234926263?accountid=131444. Year 2007.*

International Search Report and Written Opinion dated Feb. 19, 2019 in PCT Application PCT/US2018/063990.

* cited by examiner

US 11,366,884 B2

AUTHENTICATION CHALLENGES BASED ON FRAUD INITIATION REQUESTS

FIELD

The disclosure generally relates to fraud initiation requests, and more specifically, to issuing authentication challenges based on fraud initiation requests.

BACKGROUND

Applications for new transaction accounts are typically assessed for fraud or other risks before the transaction account is opened. In response to determining that there is a risk of fraud in the application, the application may be pended for review. Generally, the applicant may be manually called at the provided phone number and the applicant may be asked various questions to verify the applicant's identity and to authenticate the applicant's application. The verification process can be time consuming and inconvenient, and may cause the applicants to drop their applications for the new transaction accounts. Additionally, it may be difficult to confirm and verify that a new applicant owns the provided phone number or email address before proceeding with authenticating the applicant. Further, a high volume of contemporaneous verifications may result in excessive demands placed on legacy dialer systems, storage capacity, or other technical resources.

SUMMARY

Systems, methods, and articles of manufacture (collectively, the "system") for issuing authentication challenges based on fraud initiation requests are disclosed. The system may calculate a fraud risk level based on a fraud initiating request comprising identity-based data; determine an authentication challenge delivery channel and an authentication challenge type, in response to the fraud risk level indicating a fraud risk; transmit an authentication challenge based on the authentication challenge delivery channel and the authentication challenge type; verify an authentication challenge response based on the authentication challenge; and generate an authentication outcome based on the verification of the authentication challenge response.

In various embodiments, the fraud risk level may be calculated by comparing the identity-based data from the fraud initiating request to stored internal data. The fraud risk level may also be calculated by performing a credit risk assessment and a CBO assessment based on the identity-based data. In various embodiments, in response to the authentication outcome being successful, the fraud initiating request may be completed. In response to the authentication outcome failing, the fraud initiating request may be transmitted for a manual fraud review.

In various embodiments, the authentication challenge delivery channel may comprise at least one of an email service, a short message service (SMS), an instant messaging service, or a phone service. The authentication challenge type may comprise at least one of a one-time password, a predefined password, a driver's license number, an international mobile equipment identity (IMEI), a transaction card number, or a transaction card verification value.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
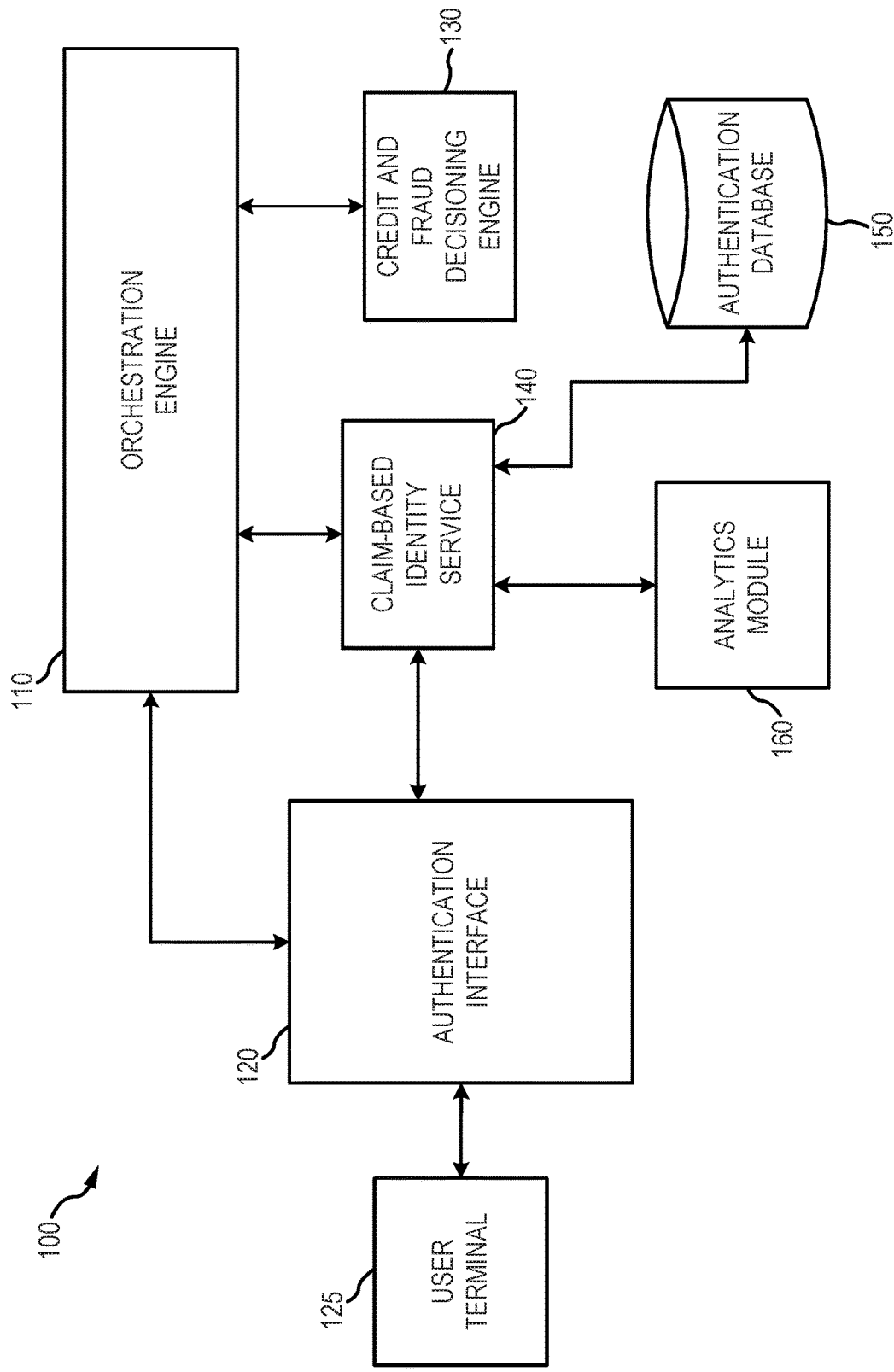
FIG. 1 is a block diagram illustrating various system components of a system for processing a fraud initiating request, in accordance with various embodiments.

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, the systems disclosed herein provide an automated process for issuing authentication challenges during fraud assessments. The systems may provide a fraud mitigation process to collect additional data during fraud assessment to resolve identity concerns based on the risk level associated with an event, action, or person. The system may further improve the customer experience of new and preexisting applicants by automating the fraud review process and at least partially reducing the need for a time-consuming and inconvenient manual review process. Further automating the fraud review process, including issuing authentication challenges, may require less operational and manual work during the fraud review process and may at least partially increase the ability of the system to issue authentication challenges at a greater rate, without decreasing the customer experience. The system may provide authentication challenges and fraud assessments in any suitable scenario such as, for example, during an acquisition process (e.g., new transaction account on-boarding, merchant on-boarding, supplier on-boarding, or the like), during an authorization process (e.g., a digital wallet provisioning, card-not-present transactions (such as American Express SafeKey®, express checkout, etc.), digital transaction charge verifications, purchases with loyalty points, or the like), during customer management processes (e.g., fraud investigations, transaction account balance transfers, transaction account credit lines and limit management, collections, or the like), during customer servicing processes (e.g., general transaction account servicing requests such as address, billing cycle, phone number, personal identification number (PIN) updates, etc.), transaction account card replacements, or the like).

The system further improves the functioning of the computer and/or network. For example, by the system automating the delivery of authentication challenges as opposed to requiring a user to manually authenticate applicants, the user performs less computer functions and provides less input, which saves on data storage and memory which speeds processing. In various embodiments, by the system automating issuing authentication challenges and resolving authentication responses, the system may also require less computer processing time, resources, and storage space to process fraud initiating requests and provide instant verification, in comparison to systems needing manual review of fraud initiating requests. In that respect, fraud initiating requests may be processed more efficiently and accurately. Additionally, by transmitting, storing, and accessing data using the processes described herein and without requiring manual intervention, the security of the data is improved, which decreases the risk of the computer or network from being compromised.

As used herein, "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" may include sending at least a portion of the electronic data from one system component to another (e.g., over a network connection). Additionally, as used herein, "data" may include encompassing information such as commands, queries, files, data for storage, and the like in digital or any other form.

In various embodiments, and with reference to FIG. 1, a system 100 for processing a fraud initiating request is disclosed. System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein. System 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing.

System 100 may comprise one or more of an orchestration engine 110, an authentication interface 120, a user terminal 125, a credit and fraud decisioning engine 130, a claim-based identity service 140, an authentication database 150, and/or an analytics module 160. The various systems, engines, interfaces, terminals, modules, services, processors and databases in system 100 may be in direct logical communication with each other via a bus, network, and/or through any other suitable means, or may be individually connected, as described further herein. For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system. For example, and in accordance with various embodiments, the individual components of system 100 may be interconnected via a network.

As used herein, the term "network" may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, Digital Subscriber Line (DSL), or various wireless communication methods. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

In various embodiments, orchestration engine 110 may be in electronic and/or logical communication with authentication interface 120, credit and fraud decisioning engine 130, and/or claim-based identity service 140. Orchestration engine 110 may comprise any suitable combination of hardware, software, databases, or the like. For example, orchestration engine 110 may comprise a computer-based system, processor, or the like capable of receiving and transmitting data, performing various operations, and/or instructing various system 100 components as discussed further herein. In that regard, orchestration engine 110 may include one or more processors and/or one or more tangible, non-transitory memories and be capable of implementing logic. In various embodiments, orchestration engine 110 may comprise a processor configured to implement various logical operations in response to execution of instructions, for example, instructions stored on a non-transitory, tangible, computer-readable medium.

In various embodiments, user terminal 125 may comprise any suitable hardware, software, and/or database components capable of sending, receiving, and storing data. For example, user terminal 125 may comprise a personal computer, personal digital assistant, cellular phone, smartphone (e.g., IPHONE®, BLACKBERRY®, and/or the like), kiosk, and/or the like. User terminal 125 may comprise an operating system, such as, for example, a WINDOWS® mobile operating system, an ANDROID® Operating System, APPLE® IOS®, a BLACKBERRY® operating system and the like. User terminal 125 may be in electronic and/or logical communication with authentication interface 120. In various embodiments, authentication interface 120 may comprise software and/or database components installed on user terminal 125. For example, authentication interface 120 may comprise an application, micro-app, web page, or the like configured to leverage the resources of the larger operating system and associated hardware on user terminal 125, via a set of predetermined rules which govern the operations of various operating systems and hardware resources, as discussed further herein. In that respect, authentication interface 120 may be in electronic and/or logical communication with orchestration engine 110, user terminal 125, and/or claim-based identity service 140.

In various embodiments, credit and fraud decisioning engine 130 may be in electronic and/or logical communication with orchestration engine 110. Credit and fraud decisioning engine 130 may also be in electronic communication with various internal data sources (e.g., transaction account owner databases, merchant databases, etc.), external data and credit vendors (e.g., LEXIS NEXIS®, NEUSTAR®, EXPERIAN®, EQUIFAX®, EMAILAGE®, TRANSUNION®, etc.), and/or any other consumer credit reporting agency, vendor, database, or system that provides information regarding consumers and businesses. Credit and fraud decisioning engine 130 may comprise any suitable combination of hardware, software, and/or database components. Credit and fraud decisioning engine 130 may comprise a computer-based system, processor, or the like capable of receiving inputs (e.g., via orchestration engine 110), retrieving data based on the inputs, performing operations on the data to calculate a fraud risk level, and transmit various data, as discussed further herein. Credit and fraud decisioning engine 130 may comprise a virtual partition of orchestration engine 110, or may comprise a physically and logically distinct processor. In that regard, credit and fraud decisioning engine 130 may include one or more processors and/or one or more tangible, non-transitory memories and be capable of implementing logic. In various embodiments, credit and fraud decisioning engine 130 may comprise a processor configured to implement various logical operations in response to execution of instructions, for example, instructions stored on a non-transitory, tangible, computer-readable medium. Credit and fraud decisioning engine 130 may also be configured to perform various logical operations in response to receiving commands from orchestration engine 110, as discussed further herein.

Figure 2:
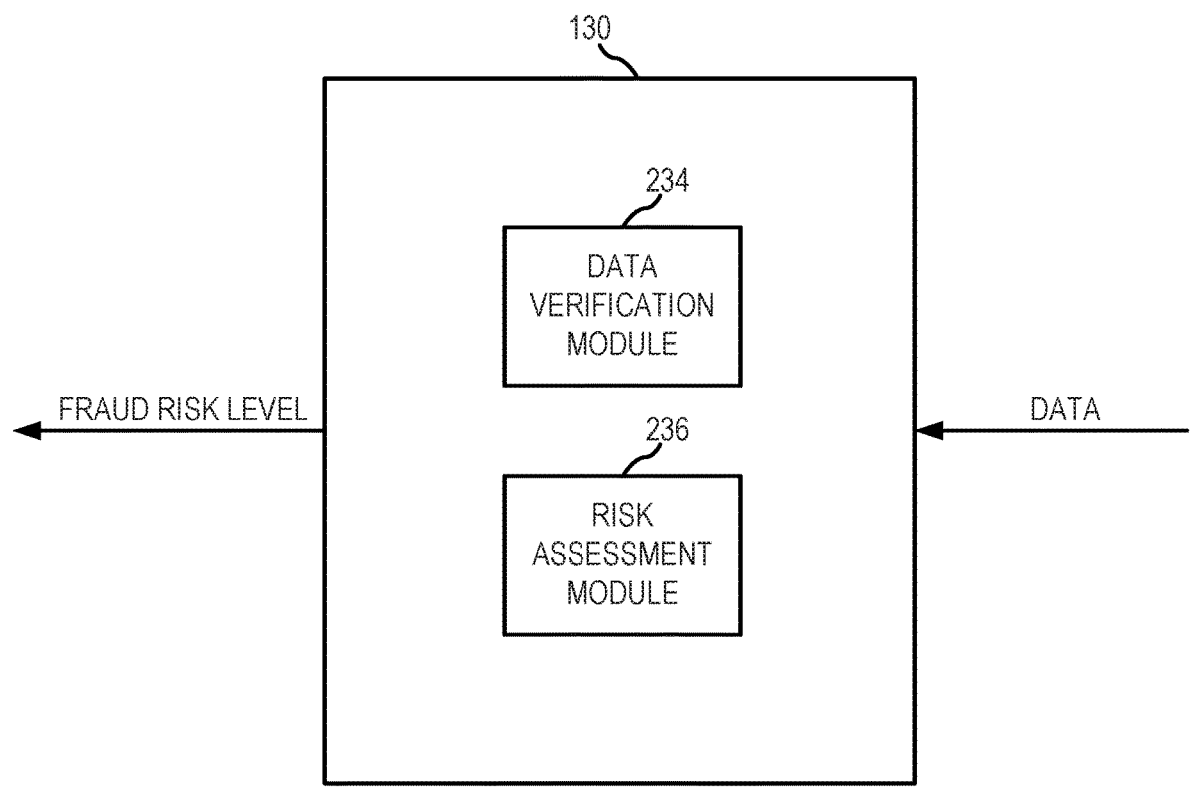
FIG. 2 illustrates various system components of a credit and fraud decisioning engine, in accordance with various embodiments.

In various embodiments, and with reference to FIG. 2, an exemplary credit and fraud decisioning engine 130 is depicted. Credit and fraud decisioning engine 130 may comprise a data verification module 234 and/or a risk assessment module 236. Data verification module 234 may be configured to verify identity-based data from fraud initiating requests to determine the accuracy of the data, as discussed further herein. Risk assessment module 236 may be configured to query data sources (e.g., internal data sources, external data sources and vendors, etc.), and perform various credit risk assessments, fraud risk assessments, CBO assessments, and/or the like, as discussed further herein.

In various embodiments, claim-based identity service 140 may be in electronic and/or logical communication with orchestration engine 110, authentication interface 120, authentication database 150, and/or analytics module 160. Claim-based identity service 140 may comprise any suitable combination of hardware, software, and/or database components. Claim-based identity service 140 may comprise a computer-based system, processor, or the like capable of receiving inputs (e.g., via orchestration engine 110), querying one or more system 100 components based on the inputs, retrieving data based on the inputs, performing operations on the data to generate an authentication challenge, and transmitting and receiving various data, as discussed further herein. Claim-based identity service 140 may comprise a virtual partition of orchestration engine 110, or may comprise a physically and logically distinct processor. In that regard, claim-based identity service 140 may include one or more processors and/or one or more tangible, non-transitory memories and be capable of implementing logic. In various embodiments, claim-based identity service 140 may comprise a processor configured to implement various logical operations in response to execution of instructions, for example, instructions stored on a non-transitory, tangible, computer-readable medium. Claim-based identity service 140 may also be configured to perform various logical operations in response to receiving commands from orchestration engine 110, as discussed further herein.

Figure 3:
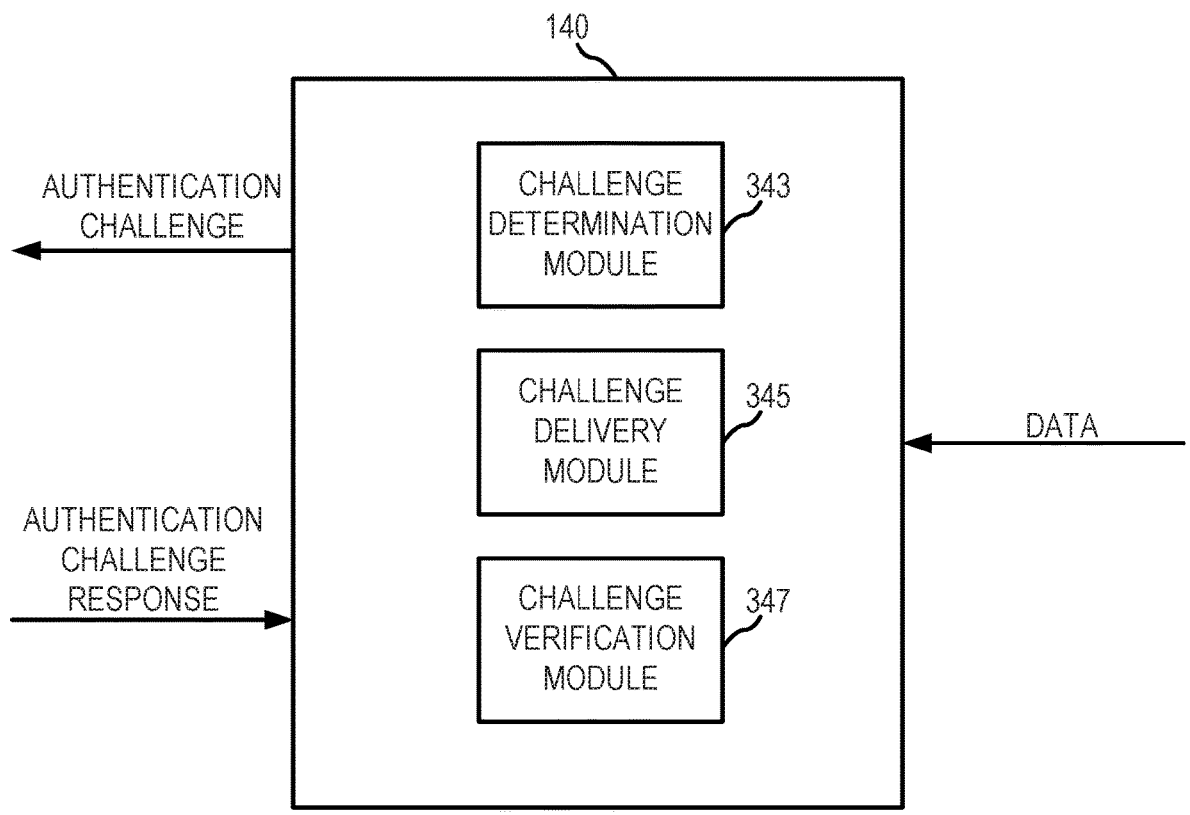
FIG. 3 illustrates various system components of a claim-based identity service, in accordance with various embodiments.

In various embodiments, and with reference to FIG. 3, an exemplary claim-based identity service 140 is depicted. Claim-based identity service 140 may comprise a challenge determination module 343, a challenge delivery module 345, and/or a challenge verification module 347. Challenge determination module 343 may be configured to determine the authentication challenge type to transmit to an applicant during an authentication challenge, as discussed further herein. Challenge delivery module 345 may be configured to determine the authentication challenge delivery channel to use to transmit the authentication challenge to the applicant, as discussed further herein. Challenge delivery module 345 may also be configured to transmit the authentication challenge through the eligible authentication challenge delivery channel. Challenge verification module 347 may be configured to receive authentication challenge responses, and verify the authentication challenge response by comparing the authentication challenge response against identity-based data corresponding to the authentication challenge, as discussed further herein.

In various embodiments, authentication database 150 may be in electronic and/or logical communication with claim-based identity service 140. Authentication database 150 may comprise any suitable type of database, and may store the data using any suitable technique described herein or known in the art.

In various embodiments, analytics module 160 may be in electronic and/or logical communication with claim-based identity service 140. Analytics module 160 may comprise any suitable combination of hardware, software, and/or database components. For example, analytics module 160 may comprise a computer-based system, processor, or the like capable of receiving data (e.g., via analytics module 160), performing operations on the data to generate an analytics report, and transmitting and receiving various data, as discussed further herein. Analytics module 160 may comprise a virtual partition of orchestration engine 110 and/or claim-based identity service 140, or may comprise a physically and logically distinct processor. In that regard, analytics module 160 may include one or more processors and/or one or more tangible, non-transitory memories and be capable of implementing logic. In various embodiments, analytics module 160 may comprise a processor configured to implement various logical operations in response to execution of instructions, for example, instructions stored on a non-transitory, tangible, computer-readable medium. Analytics module 160 may also be configured to perform various logical operations in response to receiving commands from claim-based identity service 140, as discussed further herein. For example, and in accordance with various embodiments, analytics module 160 may be configured to receive one or more of the fraud initiating request, the fraud authentication challenge, the fraud authentication response, and the fraud authentication outcome from claim-based identity service 140. Analytics module 160 may use machine learning and data analytics modules to analyze the fraud initiating request, the fraud authentication challenge, the fraud authentication response, and the fraud authentication outcome to improve the processing of fraud initiating requests. For example, analytics module 160 may determine to change the eligible challenge types and/or eligible challenge delivery channels in real-time in response to the fraud authentication outcome failing, or in response to errors being received while processing the fraud initiating request.

Figure 4:
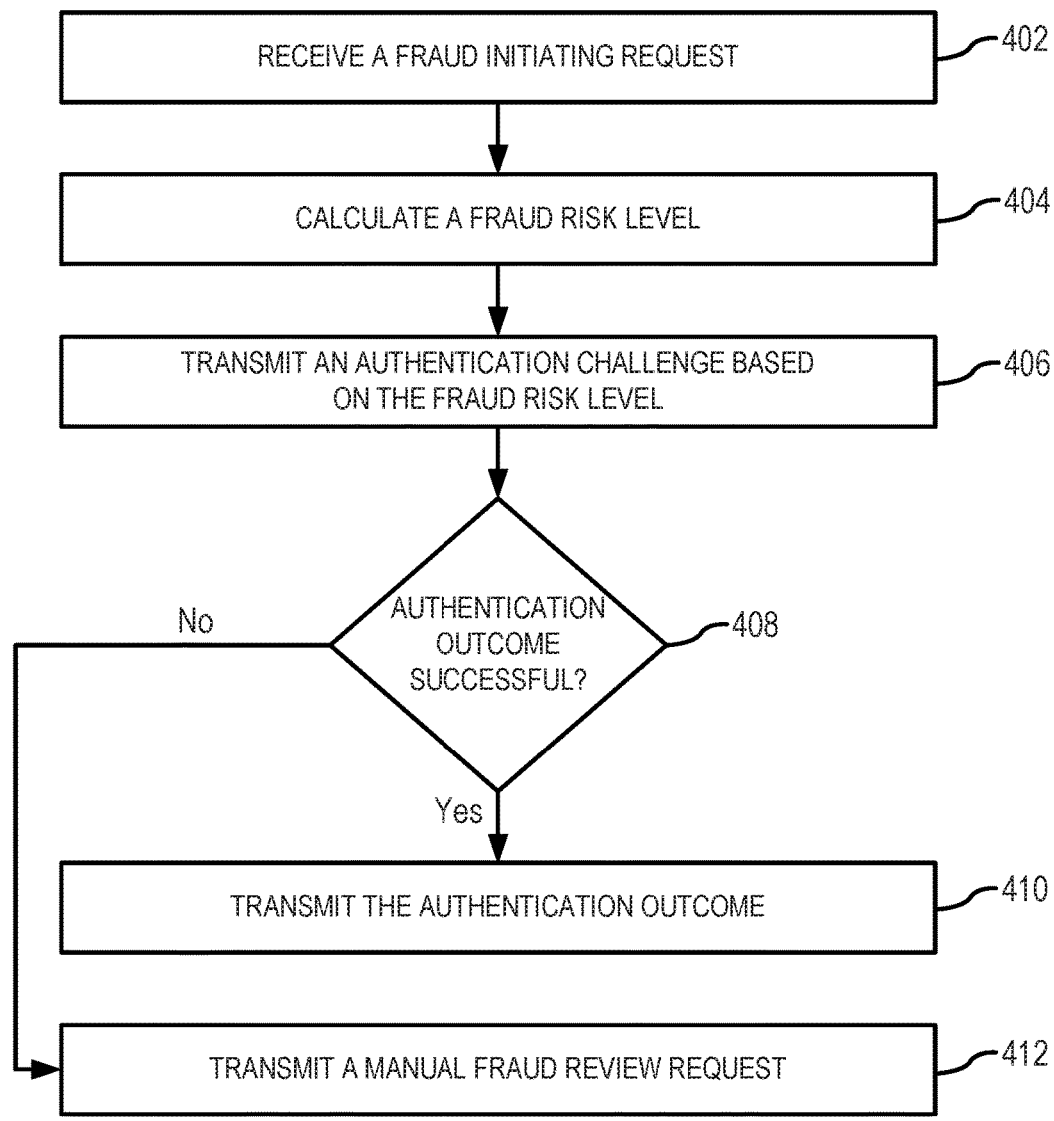
FIG. 4 illustrates a process flow for a method of authenticating a fraud initiating request, in accordance with various embodiments.
Figure 5:
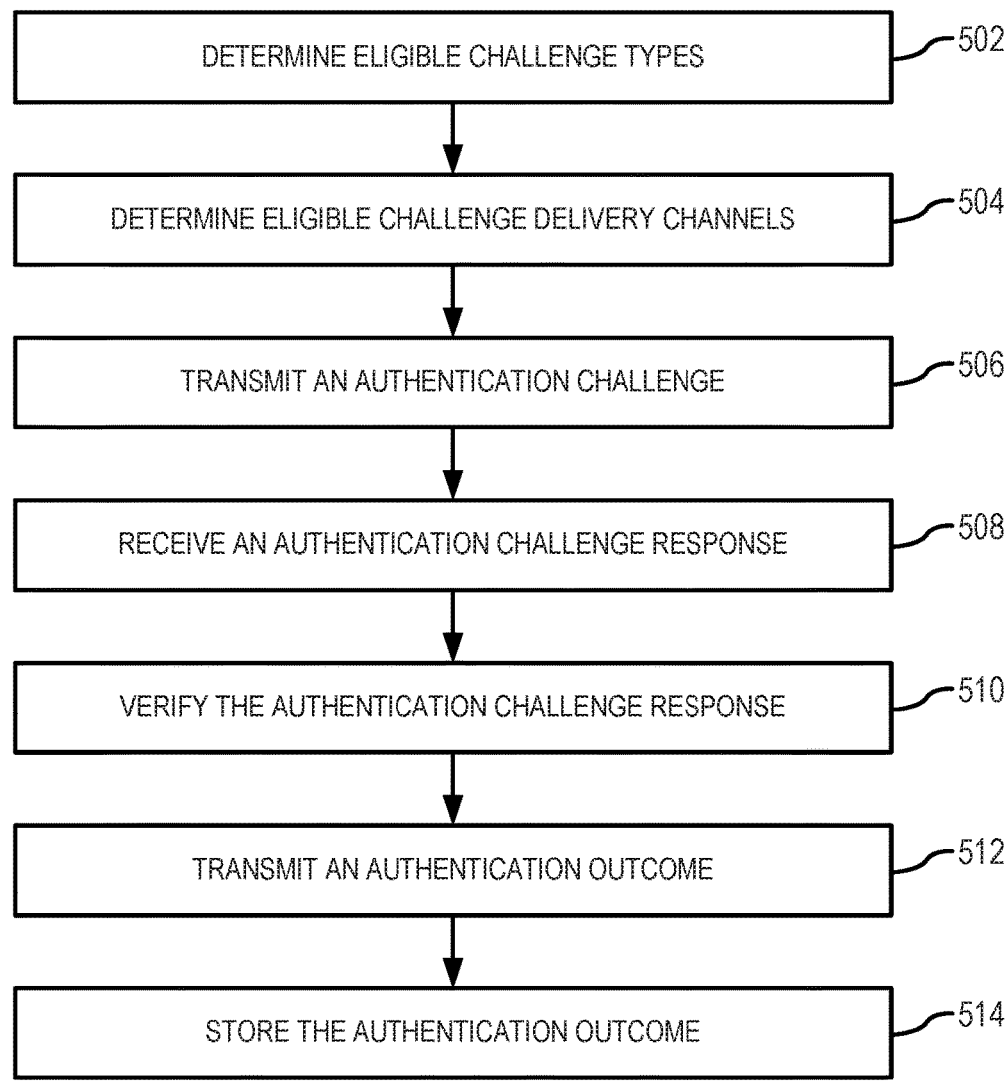
FIG. 5 illustrates a process flow for a method of providing an authentication challenge, in accordance with various embodiments.

Referring now to FIGS. 4 and 5, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 4 and 5, but also to the various system components as described above with reference to FIGS. 1-3.

In various embodiments, and with reference to FIG. 4, a method 401 for authenticating a fraud initiating request is disclosed. Method 401 may comprise receiving a fraud initiating request (step 402). The fraud initiating request may comprise any suitable request to resolve identity concerns based on a risk level associated with an event, action, person, or the like. User terminal 125 and/or authentication interface 120 may be configured to transmit the fraud initiating request to orchestration engine 110. For example, the fraud initiating request may be generated and transmitted during an acquisition process, such as new transaction account on-boarding, merchant on-boarding, supplier on-boarding, or the like; during an authorization process, such as a digital wallet provisioning, card-not-present transactions (e.g., American Express SafeKey®, express checkout, etc.), digital transaction charge verifications, purchases with loyalty points, or the like; during customer management processes, such as fraud investigations, transaction account balance transfers, transaction account credit lines and limit management, collections, or the like; during customer servicing processes, such as general transaction account servicing requests (e.g., address, billing cycle, phone number, personal identification number (PIN) updates, etc.), transaction account card replacements, or the like; and/or the like. The fraud initiating request may comprise identity-based data, such as, for example, name (e.g., first name, last name, business name, etc.), address, telephone number, email address, transaction account number, merchant identifier, and/or any other suitable data. The fraud initiating request may be transmitted using any suitable process, such as, for example, using a simple object access protocol (SOAP) message format.

Method 401 may comprise calculating a fraud risk level (step 404). The fraud risk level may be at least partially based on the fraud initiating request. Orchestration engine 110 may be configured to transmit the fraud initiating request to credit and fraud decisioning engine 130 to calculate the fraud risk level. The fraud risk level may be used to indicate the probability that the fraud initiating request is fraudulent, may be able to pass standard fraud controls, and/or may be part of an automated and/or large scale fraudulent attack. Credit and fraud decisioning engine 130, via data verification module 234, may parse the fraud initiating request and may perform various operations based on the data contained therein. Each data field in the fraud initiating request may be labeled, and/or may comprise metadata, tags, or the like indicating the types of data contained within each data field. In that respect, credit and fraud decisioning engine 130 may comprise rules corresponding to each data field that instruct and control how each data field in the fraud initiating request is handled and processed, based on the metadata, tag, or the like. Credit and fraud decisioning engine 130, via data verification module 234, may verify the data from the fraud initiating request to determine a risk of fraud. To verify, the credit and fraud decisioning engine 130 may query internal data sources (e.g., transaction account holder databases, merchant databases, etc.) to determine whether the data from the fraud initiating request is accurate. For example, credit and fraud decisioning engine 130 may query internal data sources to locate matches of the provided name, address, telephone number, email address, transaction account number, merchant identifier, or the like, to determine whether data from the fraud initiating request can be verified from internal data sources.

In various embodiments, credit and fraud decisioning engine 130, via data verification module 234, may also query external data sources and vendors to verify the data. For example, credit and fraud decisioning engine 130 may query LEXIS NEXIS®, NEUSTAR®, EXPERIAN®, EQUIFAX®, EMAILAGE®, TRANSUNION®, and/or any other consumer credit reporting agency, vendor, database, or system that provides information regarding consumers and businesses (e.g., an internal customer history database, etc.). Credit and fraud decisioning engine 130 may query the external data sources to verify that the identity-based data from the fraud initiating request is accurate and valid.

In various embodiments, credit and fraud decisioning engine 130, via risk assessment module 236, may also query external data sources and vendors to perform credit risk assessments (e.g., credit reports), credit buy out ("CBO") risk assessments, or the like. Credit and fraud decisioning engine 130 may use the data returned from the external data sources and vendors to drive risk models and to predict the risk of negative activity or fraud occurring. For example, the credit risk assessments may return a risk of default, the CBO risk assessment may return a risk of credit bust out (e.g., a type of fraud where a consumer applies for a transaction account, establishes a normal usage pattern and repayment history, then racks up numerous charges and/or maxes out the transaction card with no intention of repayment), and the like. In that respect, credit and fraud decisioning engine 130 may determine whether the applicant's credit is approved and whether any CBO concerns or fraud concerns exist.

Credit and fraud decisioning engine 130, via risk assessment module 236, may calculate the fraud risk level based on the verified identity-based data, the credit risk assessment, and/or the CBO assessment. Credit and fraud decisioning engine 130 may also calculate the fraud risk level based on application statistics, such as, for example, the IP address from user terminal 125 that initiated the fraud initiating request, the velocity of fraud initiating requests having similar data and attributes (e.g., the same name, address, etc.), whether the fraud initiating request is from a preexisting transaction account holder or merchant, or the like. In various embodiments, credit and fraud decisioning engine 130 may calculate the fraud risk level based on machine learning models, and/or through any other suitable method. The fraud risk level may comprise a score having any suitable range (e.g., 0-1, 1-100, etc.), wherein a high score corresponds to a fraud initiating request having a high risk of fraud and a low score corresponds to a fraud initiating request having a low risk of fraud. Credit and fraud decisioning engine 130 may transmit the fraud risk level to orchestration engine 110, such as, for example using a simple object access protocol (SOAP) message format.

Method 401 may comprise transmitting an authentication challenge based on the fraud risk level (step 406). Based on the evaluation of the fraud risk level, it may be determined that there is a need for extra verification (e.g., based on a "high" fraud risk level, a regulatory requirement, etc.). The authentication challenge may comprise an additional prompt to the applicant to answer a question (e.g., the authentication challenge) to further authenticate the applicant, as discussed further herein. Orchestration engine 110 may invoke claim-based identity service 140 to perform the operations for providing the authentication challenge. For example, and in accordance with various embodiments, orchestration engine 110 may transmit the fraud initiating request, the fraud risk level, and the verified identity-based data to claim-based identity service 140. The data may be transmitted using any suitable process, such as, for example, using a simple object access protocol (SOAP) message format. As a further example, and in accordance with various embodiments, claim-based identity service 140 may comprise an application programming interface (API) configured to receive an API request from orchestration engine 110 and to perform various operations based on the API request. The API request may comprise the fraud initiating request, the fraud risk level, and the verified identity-based data.

Claim-based identity service 140 may be configured to generate and transmit the authentication challenge using any suitable technique. For example, in accordance with various embodiments and with reference to FIG. 5, a method 501 for providing an authentication challenge is disclosed. Method 501 may comprise determining eligible challenge types (step 502) and determining eligible challenge delivery channels (step 504). Claim-based identity service 140, via challenge determination module 343 and challenge delivery module 345, may be configured to determine the eligible challenge types and challenge delivery channels based on the data received from orchestration engine 110, including the fraud initiating request, the fraud risk level, and the verified identity-based data.

The authentication challenge type may comprise any type of data that can be used to verify the applicant, such as, for example, a one-time password, a predefined password, a driver's license number, an international mobile equipment identity (IMEI), a transaction card number, a transaction card verification value, or the like. Claim-based identity service 140, via challenge determination module 343, may be configured to determine the eligible challenge types based on the data received from orchestration engine 110, including the fraud initiating request, the fraud risk level, and the verified identity-based data. For example, wherein the applicant is a preexisting customer from which internal data exists, the applicant's predefined password, transaction card number, and/or transaction card verification value may be eligible as an authentication challenge. As a further example, wherein the mobile device or phone number of the applicant was verified, the authentication challenge type may comprise a one-time password sent to the device or telephone. In that regard, the authentication challenge type may comprise any type of challenge of which verified identity-based data exists.

The authentication challenge delivery channel may comprise any verified method enabling the system to transmit the authentication challenge to the applicant, via authentication interface 120, such as, for example, an email service, a short message service (SMS), an instant messaging service, a phone service, or the like. Claim-based identity service 140, via challenge delivery module 345, may be configured to determine the eligible challenge delivery channels based on the data received from orchestration engine 110, including the fraud initiating request, the fraud risk level, and the verified identity-based data. For example, where the verification of the provided email address indicates that the email address was recently changed or created, the eligible challenge delivery channels may not include email service. Wherein verification of the provided phone number indicates that the phone number is to a landline, the eligible challenge delivery channels may not include the short message service (SMS) and/or the instant messaging service. In that regard, the eligible challenge delivery channels may indicate the verified channels that the applicant can be contacted using.

Claim-based identity service 140 may generate one or more authentication challenges based on the verified identity-based data, the authentication challenge type, and the authentication challenge delivery channel. Method 501 may comprise transmitting an authentication challenge (step 506). Claim-based identity service 140 may transmit one or more authentication challenges according to the eligible challenge delivery channels. For example, claim-based identity service 140 may transmit instructions to authentication interface 120 to display one or more authentication challenges. The applicant, via user terminal 125, may select at least one of the authentication challenges and input a response based on the authentication challenge. In response to receiving the input, authentication interface 120 may generate an authentication challenge response comprising the input, and may transmit the authentication challenge response to claim-based identity service 140.

Method 501 may comprise receiving an authentication challenge response (step 508). Claim-based identity service 140 may receive the authentication challenge response from authentication interface 120. Method 501 may comprise verifying the authentication challenge response (step 510). Claim-based identity service 140, via challenge verification module 347, may be configured to verify the authentication challenge response using any suitable verification or comparison technique. For example, claim-based identity service 140 may verify the authentication challenge response by comparing data from the authentication challenge response to corresponding identity-based data from the fraud initiating request, or corresponding internal data from accounts receivable databases, transaction account databases, merchant databases, external third-party data sources, or the like. Wherein the authentication challenge comprises a one-time password, the authentication challenge response may be verified by comparing the response to the previously generated one-time password.

Method 501 may comprise transmitting an authentication outcome (step 512). The authentication outcome may comprise data such as the authentication challenge, the authentication challenge response, and an indicator of whether the authentication challenge matched the authentication challenge response (e.g., as verified in step 510). Claim-based identity service 140, via challenge verification module 347, may generate the authentication outcome and may transmit the authentication outcome to authentication interface 120. Method 501 may comprise storing the authentication outcome (step 514). Claim-based identity service 140 may also transmit the authentication outcome to authentication database 150. Authentication database 150 may store the authentication outcome using any suitable technique. In various embodiments, authentication database 150 may also be configured to store the authentication challenge and/or the authentication challenge response associated with the authentication outcome.

With reference again to FIG. 4, and in accordance with various embodiments, the authentication outcome may be successful or may fail (step 408). In response to the authentication outcome being successful, method 401 may comprise transmitting the authentication outcome (step 410). Claim-based identity service 140 may transmit the authentication outcome to authentication interface 120 (e.g., directly to authentication interface 120 or via orchestration engine 110) to complete the fraud initiating request. For example, in various embodiments wherein the fraud initiating request relates to a new transaction account on-boarding, in response to the fraud initiating request being complete, the transaction account may be opened and membership may be granted or transaction account data may be displayed or transmitted. In response to the authentication outcome failing, method 401 may comprise transmitting a manual fraud review request (step 412). In that regard, the fraud initiating request may be pended until completion of the manual fraud review. For example, the applicant may be manually called to discuss the application and to verify information regarding the applicant.

The disclosure and claims do not describe only a particular outcome of issuing authentication challenges during fraud assessments, but the disclosure and claims include specific rules for implementing the outcome of issuing authentication challenges during fraud assessments and that render information into a specific format that is then used and applied to create the desired results of issuing authentication challenges during fraud assessments, as set forth in *McRO, Inc. v. Bandai Namco Games America Inc.* (Fed. Cir. case number 15-1080, Sep. 13, 2016). In other words, the outcome of issuing authentication challenges during fraud assessments can be performed by many different types of rules and combinations of rules, and this disclosure includes various embodiments with specific rules. While the absence of complete preemption may not guarantee that a claim is eligible, the disclosure does not sufficiently preempt the field of issuing authentication challenges during fraud assessments at all. The disclosure acts to narrow, confine, and otherwise tie down the disclosure so as not to cover the general abstract idea of just issuing authentication challenges during fraud assessments. Significantly, other systems and methods exist for issuing authentication challenges, so it would be inappropriate to assert that the claimed invention preempts the field or monopolizes the basic tools of issuing authentication challenges. In other words, the disclosure will not prevent others from issuing authentication challenges during fraud assessments, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include a graphical user interface for dynamically relocating/rescaling obscured textual information of an underlying window to become automatically viewable to the user (via user terminal 125). By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., FACEBOOK®, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, FACEBOOK® message, TWITTER® tweet and/or message, MMS, and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory or in-memory (non-spinning) hard drives. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The computer system or any components may integrate with system integration technology such as, for example, the ALEXA system developed by AMAZON®. ALEXA is a cloud-based voice service that can help you with tasks, entertainment, general information and more. All AMAZON® ALEXA devices, such as the AMAZON ECHO®, AMAZON ECHO DOT®, AMAZON TAP®, and AMAZON FIRE® TV, have access to the ALEXA system. The ALEXA system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The ALEXA system may allow the user to access information about eligible accounts linked to an online account across all ALEXA-enabled devices.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEBSPHERE®, WEBLOGIC®, MOSS®, EDB® POSTGRES PLUS ADVANCED SERVER® (PPAS), etc.). In various embodiments, the server may include web servers (e.g. APACHE®, IIS, GWS, SUN JAVA® SYSTEM WEB SERVER, JAVA® Virtual Machine running on LINUX® or WINDOWS®).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MAC- BOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

As those skilled in the art will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®), a BLACKBERRY® operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16-bit integers.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. Record of Charge (ROC) data includes important information and enhanced data. For example, a ROC may contain details such as location, merchant name or identifier, transaction amount, transaction date, account number, account security pin or code, account expiry date, and the like for the transaction. Such enhanced data increases the accuracy of matching the transaction data to the receipt data. Such enhanced ROC data is NOT equivalent to transaction entries from a banking statement or transaction account statement, which is very limited to basic data about a transaction. Furthermore, a ROC is provided by a different source, namely the ROC is provided by the merchant to the transaction processor. In that regard, the ROC is a unique identifier associated with a particular transaction. A ROC is often associated with a Summary of Charges (SOC). The ROCs and SOCs include information provided by the merchant to the transaction processor, and the ROCs and SOCs are used in the settlement process with the merchant. A transaction may, in various embodiments, be performed by a one or more members using a transaction account, such as a transaction account associated with a gift card, a debit card, a credit card, and the like.

A distributed computing cluster may be, for example, a HADOOP® cluster configured to process and store big data sets with some of the nodes comprising a distributed storage system and some of the nodes comprising a distributed processing system. In that regard, distributed computing cluster may be configured to support a HADOOP® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any databases discussed herein may include relational, hierarchical, graphical, blockchain, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT® ACCESS® or MICROSOFT® SQL Server® by MICROSOFT® Corporation (Redmond, Wash.), MYSQL® by MySQL AB (Uppsala, Sweden), MongoDB®, Redis®, Apache Cassandra®, HBase by APACHE®, MapR-DB, or any other suitable database product. Moreover, the databases may be organized in any suitable manner, for example, as data tables or lookup tables. Each record may be a single file, a series of files, a linked series of data fields. or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. For more information on blockchain-based payment networks, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, and U.S. application Ser. No. 15/785,870 titled API REQUEST AND RESPONSE BALANCING AND CONTROL ON BLOCKCHAIN and filed on Oct. 17, 2017, the contents of which are each incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPE"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® web server software, a MICROSOFT® SQL Server database system, and a MICROSOFT® Commerce Server. Additionally, components such as MICROSOFT® ACCESS® or MICROSOFT® SQL Server, ORACLE®, SYBASE®, INFORMIX® MySQL, INTERBASE®, etc., may be used to provide an Active Data Object (ADO) compliant database management system. In one embodiment, the Apache web server is used in conjunction with a Linux operating system, a MYSQL® database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT®, active server pages (ASP), common gateway interface scripts (CGI), extensible markup language (XML), dynamic HTML, cascading style sheets (CSS), AJAX (Asynchronous JAVASCRIPT® And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE® MQTM (formerly MQSeries) by IBM®, Inc. (Armonk, N.Y.) is an example of a commercially available middleware product. An Enterprise Service Bus ("ESB") application is another example of middleware.

Those skilled in the art will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT®, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks (e.g., method 201, with brief reference to FIG. 2).

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In re Nuijten* to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is intended to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
    receiving, by a processor, a provisioning request for a payment instrument to a digital wallet of a client device;
    initiating, by the processor, an authorization process by generating a fraud initiating request in response to receiving the provisioning request;
    verifying, by the processor, a portion of identity-based data for the fraud initiating request based at least in part on a data type of the portion of the identity-based data and a rule associated with the data type, and the rule for verifying the portion of the identity-based data comprises querying a database;
    calculating, by the processor, a fraud risk level for the fraud initiating request based at least in part on an internet protocol address of the client device and an accuracy result generated from verifying the portion of the identity-based data;
    determining, by the processor, an authentication challenge type in response to the fraud risk level meeting a threshold;
    determining, by the processor, an authentication challenge delivery channel in an instance in which the fraud risk level has met the threshold, wherein the authentication challenge delivery channel is determined based at least in part on verifying the portion of the identity-based data;
    displaying, by the processor, on the client device a prompt that includes an authentication challenge using the authentication challenge delivery channel, wherein the authentication challenge is based at least in part on the authentication challenge type;
    verifying, by the processor, an authentication challenge response received as an input from the prompt based at least in part on comparing the authentication challenge response to the identity-based data associated with the authentication challenge;
    generating, by the processor, an authentication outcome based on the verification of the authentication challenge response; and
    authorizing, by the processor, the provisioning request of the payment instrument to the digital wallet of the client device based at least in part on the authentication outcome.

2. The method of claim 1, wherein the fraud risk level is calculated by comparing the identity-based data from the fraud initiating request to at least one of stored internal data or external third-party data.

3. The method of claim 1, wherein the fraud risk level is calculated by performing a credit risk assessment and a credit buy out (CBO) assessment based on the identity-based data.

4. The method of claim 1, wherein in response to the authentication outcome being successful, the fraud initiating request is completed.

5. The method of claim 1, wherein in response to the authentication outcome failing, the fraud initiating request is transmitted for a manual fraud review.

6. The method of claim 1, wherein the authentication challenge delivery channel comprises at least one of an email service, a short message service (SMS), an instant messaging service, or a phone service.

7. The method of claim 1, wherein the authentication challenge type comprises at least one of a one-time password, a predefined password, a driver's license number, an international mobile equipment identity (IMEi), a transaction card number, or a transaction card verification value.

8. A system comprising:
    a computing device that comprises a processor,
    a tangible, non-transitory memory configured to communicate with the processor, the tangible, non-transitory memory having instructions stored thereon that, in response to execution by the processor, cause the computing device to at least:
    receive a provisioning request for a payment instrument to a digital wallet of a client device;

initiate an authorization process by generating a fraud initiating request in response to receiving the provisioning request;

verify a portion of identity-based data for the fraud initiating request based at least in part on a data type of the portion of the identity-based data and a rule associated with the data type, and the rule for verifying the portion of the identity-based data comprises querying a database;

calculate a fraud risk level for the fraud initiating request based at least in part on an internet protocol address of the client device and an accuracy result generated from verifying the portion of the identity-based data;

determine an authentication challenge type in response to the fraud risk level meeting a threshold;

determine an authentication challenge delivery channel in an instance in which the fraud risk level has met the threshold, wherein the authentication challenge delivery channel is determined based at least in part on verifying the portion of the identity-based data;

display on the client device a prompt that includes an authentication challenge using the authentication challenge delivery channel, wherein the authentication challenge is based at least in part on the authentication challenge type;

verify an authentication challenge response received as an input from the prompt based at least in part on comparing the authentication challenge response to the identity-based data associated with the authentication challenge;

generate an authentication outcome based on the verification of the authentication challenge response; and authorize the provisioning request of the payment instrument to the digital wallet of the client device based at least in part on the authentication outcome.

9. The system of claim 8, wherein the fraud risk level is calculated by comparing the identity-based data from the fraud initiating request to at least one of stored internal data or external third-party data.

10. The system of claim 8, wherein the fraud risk level is calculated by performing a credit risk assessment and a credit buy out (CBO) assessment based on the identity-based data.

11. The system of claim 8, wherein in response to the authentication outcome being successful, the fraud initiating request is completed.

12. The system of claim 8, wherein in response to the authentication outcome failing, the fraud initiating request is transmitted for a manual fraud review.

13. The system of claim 8, wherein the authentication challenge delivery channel comprises at least one of an email service, a short message service (SMS), an instant messaging service, or a phone service.

14. The system of claim 8, wherein the authentication challenge type comprises at least one of a one-time password, a predefined password, a driver's license number, an international mobile equipment identity (IMEi), a transaction card number, or a transaction card verification value.

15. An article of manufacture including a non-transitory, tangible computer readable storage medium having instructions stored thereon that, in response to execution by a computer based system, cause the computer based system to at least:

receive a provisioning request for a payment instrument to a digital wallet for a client device;

initiate an authorization process for the digital wallet by generating a fraud initiating request in response to receiving the provisioning request;

verify a portion of identity-based data for a fraud initiating request based at least in part on a data type of the portion of the identity-based data and a rule associated with the data type, and the rule for verifying the portion of the identity-based data comprises querying a database;

calculate a fraud risk level for the fraud initiating request based at least in part on an internet protocol address of the client device and an accuracy result generated from verifying the portion of the identity-based data;

determine an authentication challenge type in response to the fraud risk level meeting a threshold;

determine an authentication challenge delivery channel in an instance in which the fraud risk level has met the threshold, wherein the authentication challenge delivery channel is determined based at least in part on verifying the portion of the identity-based data;

display on the client device a prompt that includes an authentication challenge using the authentication challenge delivery channel, wherein the authentication challenge is based at least in part on the authentication challenge type;

verify an authentication challenge response received as an input from the prompt based at least in part on comparing the authentication challenge response to the identity-based data associated with the authentication challenge; and generate an authentication outcome based on the verification of the authentication challenge response; and authorize the provisioning request of the payment instrument to the digital wallet of the client device based at least in part on the authentication outcome.

16. The article of manufacture of claim 15, wherein the fraud risk level is calculated by at least one of comparing the identity-based data from the fraud initiating request to at least one of stored internal data or external third-party data, or performing a credit risk assessment and a credit buy out (CBO) assessment based on the identity-based data.

17. The article of manufacture of claim 15, wherein in response to the authentication outcome being successful, the fraud initiating request is completed.

18. The article of manufacture of claim 15, wherein the authentication challenge delivery channel comprises at least one of an email service, a short message service (SMS), an instant messaging service, or a phone service.

19. The article of manufacture of claim 15, wherein the authentication challenge type comprises at least one of a one-time password, a predefined password, a driver's license number, an international mobile equipment identity (IMEi), a transaction card number, or a transaction card verification value.

20. The method of claim 1, wherein the authentication challenge delivery channel is a first authentication challenge delivery channel, and the method further comprising:

identifying, by the processor, a failure of the authentication outcome based at least in part on the verification of the authentication challenge response changing, by the processor, the first authentication challenge delivery channel to a second authentication challenge delivery channel based at least in part on the authentication outcome; and displaying, by the processor, on the client device a second prompt that includes the authentication challenge using the second authentication challenge delivery channel.

\* \* \* \* \*